(12) United States Patent
Polo et al.

(10) Patent No.: US 9,326,239 B2
(45) Date of Patent: Apr. 26, 2016

(54) MANAGING CONNECTIVITY BETWEEN WIRELESS DEVICES

(71) Applicant: Broadcom Corporation, Irvine, CA (US)

(72) Inventors: Angel Polo, Solana Beach, CA (US); Chikan Kwan, San Diego, CA (US); Guoxin Xie, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 182 days.

(21) Appl. No.: 13/631,677

(22) Filed: Sep. 28, 2012

(65) Prior Publication Data

US 2014/0094123 A1    Apr. 3, 2014

(51) Int. Cl.
| H04W 52/02 | (2009.01) |
| H04W 4/00 | (2009.01) |
| H04W 84/18 | (2009.01) |
| H04W 84/20 | (2009.01) |
| H04W 24/00 | (2009.01) |
| H04W 48/16 | (2009.01) |
| H04W 64/00 | (2009.01) |

(52) U.S. Cl.
CPC .......... *H04W 52/0216* (2013.01); *H04W 4/008* (2013.01); *H04W 24/00* (2013.01); *H04W 48/16* (2013.01); *H04W 64/00* (2013.01); *H04W 84/18* (2013.01); *H04W 84/20* (2013.01)

(58) Field of Classification Search
None
See application file for complete search history.

(56) References Cited

U.S. PATENT DOCUMENTS

| 8,102,798 | B2* | 1/2012 | Krantz et al. ................. 370/328 |
| 2006/0268746 | A1* | 11/2006 | Wijting et al. ................ 370/254 |
| 2007/0174465 | A1 | 7/2007 | Huang et al. |
| 2008/0191845 | A1* | 8/2008 | Strzelczyk ................... 340/10.5 |
| 2008/0198820 | A1* | 8/2008 | Abdel-Kader ................ 370/338 |
| 2009/0068970 | A1* | 3/2009 | Ahmed et al. ............. 455/161.1 |
| 2009/0232117 | A1* | 9/2009 | Hara ............................ 370/338 |
| 2010/0093280 | A1* | 4/2010 | Ahn et al. .................... 455/41.2 |
| 2010/0109864 | A1 | 5/2010 | Haartsen et al. |
| 2011/0116453 | A1* | 5/2011 | Huang et al. .................. 370/329 |
| 2012/0083256 | A1* | 4/2012 | Sperling et al. ............ 455/414.2 |
| 2012/0142271 | A1 | 6/2012 | Zhodzishsky et al. |
| 2013/0040574 | A1* | 2/2013 | Hillyard ....................... 455/41.2 |
| 2013/0130680 | A1* | 5/2013 | Peterson et al. ............. 455/434 |
| 2013/0189924 | A1* | 7/2013 | Pedro et al. ................. 455/41.1 |
| 2013/0273851 | A1* | 10/2013 | Preiszler et al. ............ 455/41.2 |

* cited by examiner

*Primary Examiner* — Ping Hsieh
*Assistant Examiner* — James Yang
(74) *Attorney, Agent, or Firm* — McDermott Will & Emery LLP (57) ABSTRACT

A method for managing connectivity of a central device with a peripheral device is provided. The method includes determining a location of a central device, determining a proximity of the central device to a peripheral device group based at least in part on a comparison of the location of the central device to a location profile associated with the peripheral device group and adjusting a scanning duty cycle of the central device in response to the determined proximity of the central device to the peripheral device group. Bluetooth Low Energy modules and systems are also provided.

23 Claims, 4 Drawing Sheets

MANAGING CONNECTIVITY BETWEEN WIRELESS DEVICES

BACKGROUND

The subject technology relates to wireless communications and, more particularly, to facilitating connectivity among wireless devices.

Bluetooth® (hereinafter BLUETOOTH) is a wireless technology that provides for short-range communication between electronic devices. Presently, there are two types of BLUETOOTH systems. The first type is a Basic Rate (BR) system, which is also referred to as "classic BLUETOOTH," since the system has been in existence for some time. The second type is a newer implementation of BLUETOOTH, known as Low Energy (LE) BLUETOOTH or BLUETOOTH Low Energy (BLE).

BLE systems include features designed for lower power consumption, less complexity and a lower cost than classic BLUETOOTH systems using BR or enhanced data rate (EDR). As such, many BLE implementations have smaller form factors and may use coin cell type batteries for extended periods of operation. Due to the reduced form factor and lower power consumption, BLE devices can be implemented in a wide range of applications.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be apparent that the subject technology is not limited to the specific details set forth herein and may be practiced using other implementations. In some instances, structures and components are shown in block diagram form in order to avoid obscuring the concepts of the subject technology.

Figure 1:
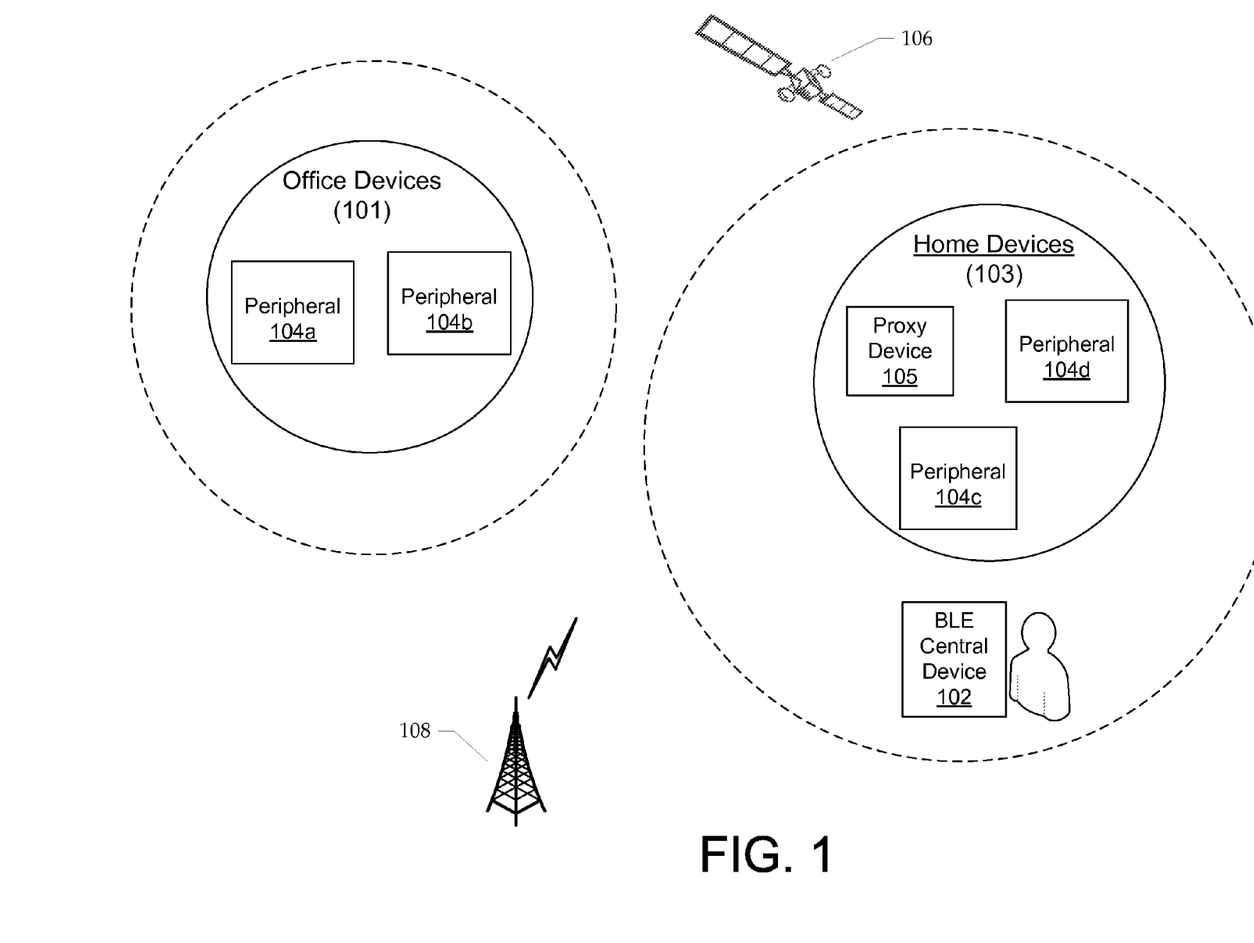
FIG. 1 illustrates a block diagram of an example BLE communication environment, including a central device and multiple peripheral devices, in accordance with some implementations of the subject technology.

FIG. 1 illustrates an example of a BLE communication environment, including a central device (e.g., central device 102), multiple peripherals (e.g., peripherals 104a-104d), proxy device 105, satellite 106 and cell tower 108, in accordance with some implementations of the subject technology. In the BLE environment of FIG. 1, peripherals 104a-104d and proxy device 105 are divided into two groups. That is, Office Devices group 101 is associated with peripherals 104a and 104b and Home Devices group 103 is associated with peripherals 104c, 104d and proxy device 105.

In one or more implementations, peripherals 104a-104d and proxy device 105 can connect to, and be controlled by, a common central device, such as central device 102. As used herein, "central device" refers to a BLE device configured to operate in a central role. Similarly, "peripheral(s)" or "peripheral device" refers to a BLE device configured to operate in a peripheral role. Although any BLE enabled wireless device may be configured to function as a central device or a peripheral, central devices are usually supported by mobile platforms or systems possessing more advanced logic and power capabilities, such as smart phones. In contrast, BLE devices operating in a peripheral role usually have smaller form factors and are configured for long-term battery-powered operation, for example, using coin cell type batteries. Any type of electronic system or mobile platform may include a BLE device, such as, but not limited to smart phones, tablet computing devices, personal computers, electronic appliances and/or wireless sensors.

Referring to FIG. 1, central device 102 could be supported by a mobile device, such as a smart phone that is associated with a user. Peripherals 104a-104d may be coupled to various objects or devices and configured to connect and communicate with central device 102.

For use in forming a connection with a peripheral, the BLUETOOTH 4.0 specification permits a central device to be in an initiation state wherein the central device (e.g., central device 102) can scan for devices with which it has been previously bonded. Upon recognition of a previously bonded peripheral (e.g., any one or more of peripherals 104a-104d), the central device can begin the process of re-forming connections with the peripherals. As illustrated in FIG. 1, central device 102 may have been bonded with peripherals in a user's home, for example, belonging to Home Devices group 103. Thus, upon entering the initiation state, central device 102 can begin the process of re-forming connections with peripherals 104c, 104d and proxy device 105 that are associated with Home Devices group 103.

To establish a BLE connection between central device 102 and peripherals 104c and 104d, central device 102 must scan for advertising packets at a time advertising packets are broadcast by peripherals 104c and 104d. The rate at which scanning is performed by central device 102 is determined by a scanning duty cycle of central device 102. Similarly, the rate at which peripherals 104c and 104d transmit advertising packets is determined by an advertising duty cycle for each of peripherals 104c and 104d. Thus, the time required to establish a connection between central device 102 and one (or both) of peripherals 104c and 104d is influenced by the scanning duty cycle of central device 102 and the advertising duty cycle of peripherals 104c and 104d. That is, higher duty cycles can correspond with faster connection formation between central device 102 and peripherals 104c and 104d.

The time needed to establish a connection between central device 102 and one or more of peripherals (e.g., peripherals 104a-104d) can be improved by either or both of increasing the scanning duty cycle of central device 102 and increasing the advertising duty cycle of peripherals 104a-104d. However, higher scanning and advertising duty cycles consume more power, making high duty cycle modes undesirable for many BLE implementations, such as those requiring battery powered operation.

BLE allows for the scanning duty cycle of a central device (e.g., central device 102) and the advertising duty cycle of a peripheral (e.g., any of peripherals 104a-104d) to be turned 'off,' such that scanning and/or advertising are not performed. BLE devices can also be placed in a continuous mode where scanning and/or advertising are performed at a full duty cycle, e.g., scanning is performed for the entire period of a fixed time duration. Alternatively, the duty cycle can be set to a middle value, wherein scanning is performed for a fractional period of a fixed time duration. However, prior BLE implementations do not provide a way to adjust the scanning duty cycle of a central device (or the advertising duty cycle of a peripheral) based on the likelihood that the central device is within an effective range of one or more peripherals. Furthermore, in prior BLE implementations, scanning and advertising are restricted to three predefined channels. As a consequence, the channels can become congested with advertising packets broadcast from multiple peripherals sharing a common location.

The subject technology provides a way to intelligently (or dynamically) adjust the scanning duty cycle of a central device (e.g., central device 102) and/or the advertising duty cycle of one or more peripherals (e.g., peripherals 104a-104d) to facilitate faster connectivity between the central device and the peripherals. In certain aspects, duty cycle adjustments are made based on the determined or predicted proximity of the central device to one or more peripherals or groups of peripherals, such as Office Devices group 101 and Home Devices group 103, illustrated in FIG. 1. Certain aspects also provide for coordinating the transmission of advertising packets amongst peripherals so as to reduce cross talk interference.

In some implementations, multiple peripherals, such as peripherals 104c, 104d and proxy 105, located in a common location are bonded with a central device, such as central device 102. After bonding between the central device and the peripherals is completed, information identifying each of the peripherals is stored, e.g., as a group that is correlated with a location profile based on the shared location of the peripherals.

In the illustration of FIG. 1, Home Devices group 103 could be used to identify peripherals located in, or around, a user's home, whereas Office Devices group 101 can be used to identify peripherals located in, or around, the user's office. The location profile that is associated with each group can be based on location information of various types, such as information received from satellite 106 and/or cell tower 108. Location information associated with a location profile may come from a variety of sources, including but not limited to one or more of GPS coordinate data, IP geo-location data, cell-tower triangulation data relative to the central device and/or one or more peripherals.

Once central device 102 is connected to peripheral 104c and 104d, a group may be created, such as Home Devices group 103, including information identifying peripherals 104c and 104d. Subsequently, Home Devices group 103 could be assigned a location profile representing the shared location of peripherals 104c and 104d, for example, including position information for identifying the physical location of the user's home.

Using the location profile for Home Devices group 103, the scanning duty cycle of central device 102 can be adjusted based on a determined proximity of central device 102 to the group. In one or more implementations, the scanning duty cycle of central device 102 can be increased when (or just before) central device 102 is determined to be within a predetermined threshold distance or range of Home Devices group 103. The scanning duty cycle can also be decreased or stopped if central device 102 is determined to be outside of a predetermined threshold distance or range of Home Devices group 103. By adjusting the scanning duty cycle of central device 102 based on its relative location to a group of known peripherals, one or more re-connections with peripherals associated with the group (e.g., peripherals 104c, 104d and proxy 105) can be expedited when central device 102 is within a connection range or other predetermined range of that group. Additionally, by reducing or turning off the scanning duty cycle when central device 102 is outside of a connectable range or other predefined range, the use of power resources by central device 102 can be reduced.

The scanning duty cycle of central device 102 can also be decreased (or stopped) in response to an indication that connections with each peripheral in a particular group have been successfully established. In one or more implementations, the scanning duty cycle of central device 102 may be increased based on a detected proximity of central device 102 to Home Devices group 103. Subsequently, after connections have been reestablished between central device 102 and each peripheral in Home Devices group 103, a high scanning duty cycle of central device 102 is no longer be needed. As such, central device 102 can reduce the scanning duty cycle (or terminate scanning altogether), based on a determination that connections have been formed with each peripheral in the group. In certain other aspects, the scanning duty cycle can be reduced after connections have been established with a threshold number or percentage of peripherals associated with a group. For example, the scanning duty cycle can be reduced after connections with all but two of the peripherals associated with a group have been established.

The scanning duty cycle of central device 102 can also be adjusted based on indications or predictions that central device 102 is located proximate to one or more peripherals, without actually measuring or calculating the location of central device 102. That is, the position of central device 102 may be inferred based on the shared grouping of a set of peripherals, for example, it may be inferred that if central device 102 is able to connect to one peripheral in Home Device group 103, other peripherals from Home Devices group 103 are likely located nearby. Thus, connection to one or more peripherals of Home Devices group 103, such as a connection to peripheral 104c, can be used as an indication to adjust a scanning duty cycle of central device 102, in order to expedite a connection with peripheral 104d and/or proxy device 105.

In some implementations, predictions can be made about the location of central device 102 based on one or more non-location-based factors, such as a schedule, calendar or predetermined time of day. In one or more implementations, it may be known that central device 102 is usually located at home at 5:00 PM, Monday through Friday, and thus central device 102 is proximate to one or more devices in Home Device group 103 associated with the home location. Based on the schedule, central device 102 can be configured to adjust its duty cycle at, or just before, 5:00 PM on Monday-Friday.

In certain aspects, a schedule for adjusting the duty cycle rate of central device 102 can be developed based on collected data relating to travel patterns, e.g., the travel patterns of a user associated with central device 102. In one or more implementations, if a user routinely enters his office each Saturday morning at 8:00 AM, time and location information reflecting the user's location could be stored over time and used to predict when to adjust the scanning duty cycle of central device 102, such as a smart phone including central device 102 that is carried by the user. As such, the scanning duty cycle of central device 102 can be adjusted on Saturday mornings, just before 8:00 AM, based on an inference that central device 102 is located proximate to a group of known peripherals, such as an Office Devices group (e.g., Office Devices group 101) associated with peripherals 104*a* and 104*b* in the user's office.

As mentioned above, the broadcasting of advertising packets by multiple peripherals in a common location, such as peripherals 104*c*, 104*d* and proxy 105, can cause cross talk interference. Advertising amongst peripherals can be coordinated so as to reduce or eliminate cross talk interference. In one aspect, peripherals 104*a*-104*d* and proxy device 105 can be configured such that advertising can be managed by central device 102. By way of example, after establishing connections with each peripheral in Home Devices group 103, central device 102 can assign a unique transmission window to each of peripherals 104*c*, 104*d* and proxy device 105, such that the advertising duty cycle of each of peripherals 104*c*, 104*d* and proxy device 105 does not overlap with that of any other device in frequency and/or time.

Peripherals may also be configured to coordinate advertising duty cycles with other peripherals using peripheral-to-peripheral awareness. By using peripheral-to-peripheral awareness one or more peripherals in a group can be configured to detect the advertising duty cycles of other peripherals in the group and to self-adjust their own advertising duty cycles to avoid interference. Referring again to FIG. 1, each of peripherals 104*c*, 104*d* and/or proxy device 105 can be configured to detect the advertising duty cycle or one or more of the other devices in Home Devices group 103 and to self-adjust their advertising duty cycle so as to reduce cross talk interference with other devices in the group.

Similarly, multiple peripherals in a group may be configured to coordinate advertising scanning rates amongst multiple other peripherals by exchanging advertising schedules. Communication amongst peripherals can be accomplished using BLUETOOTH and/or an out-of-band communication means such as WIFI. By way of example, peripherals 104*c* and 104*d* in Home Devices group 103 may coordinate advertising via proxy 105 that is configured to facilitate peripheral-to-peripheral signaling. In certain aspects, proxy 105 may provide communication between peripherals 104*c* and 104*d*, for example, via a private network, such as LAN, WAN or wireless home network.

In another aspect, a single intelligent peripheral, such as proxy 105, can facilitate reconnection amongst all localized peripherals. In such a setup, proxy 105 could issue advertisements at a higher duty cycle compared with other peripherals (e.g., peripherals 104*c* and 104*d*), thereby, increasing the likelihood of proxy 105 first connecting with central device 102. As such, proxy 105 could provide an indication to central device 102 that other peripherals in the same group are also available for reconnection.

Although a BLE communication environment can include various numbers of central devices and/or peripherals, the example of FIG. 1 comprises multiple peripherals (e.g., peripherals 104*a*-104*d*), proxy device 105 and a single central device (e.g., central device 102). As illustrated in FIG. 1, Office Devices group 101 and Home Devices group 103 are each associated with a threshold distance defining the boundary of the respective group. The dotted circle enclosing each respective group represents the threshold distance within which central device 102 is determined to be "proximate to" the respective group. In the example of FIG. 1, central device 102 would be determined to be proximate to Home Devices group 103 because it is located within the threshold distance of Home Devices group 103.

It is understood that threshold distances defining how far a central device can be from a group before being considered "proximate to" the group may vary with implementation. In certain aspects, the threshold distance is correlated with a connection distance between the central device and the peripherals of a particular group that is based on the range of radio communications of the respective devices.

Peripherals 104*a*-104*d* and proxy device 105 can include any device(s) configured to transmit advertising packets according to the BLE standard. In this sense, peripherals 104*a*-104*d* and proxy device 105 can include any suitable logic, circuitry and/or code to periodically broadcast advertisement packets in BLE advertising channels.

Central device 102 can include any suitable logic, circuitry and/or code that can be operable to scan for advertising packets from BLE advertisers, such as peripherals 104*a*-104*d* and proxy device 105. Central device 102 can be configured to perform a passive scan or an active scan. In a passive scan, central device 102 can scan for advertising packets and may not transmit messages to peripherals. In an active scan, central device 102 can transmit one or more requests to a peripheral, requesting information not included in the advertising packets.

As noted above, central device 102 can be integrated with any device or mobile platform for use in communicating with one or more peripherals. In some implementations, central device 102 is integrated into a processor-based system, such as a computer, smart-phone or tablet computing device. Any system in which central device 102 is incorporated can also be thought of as a host device (or mobile platform), which can include a host processor, memory, and other computing resources, and that support central device 102 (e.g., a BLE device operating in a central role) to facilitate communication with other devices in a BLE communication environment, as will be described in further detail with respect to FIG. 2 below.

In one or more implementations, central device 102 can be configured to receive transmissions from satellite 106 and/or cell tower 108 that can be used to determine a location of central device 102. It is understood that location information may be received (or determined) by central device 102 and/or by the host device using signaling provided by one or more other devices (e.g., satellites, cell towers and/or WIFI networks) not depicted in the environment of FIG. 1.

In certain implementations, central device 102 is connected to a set of peripherals in a given location, for example, central device 102 may establish BLE connections with several peripherals in the user's home, such as peripherals 104*c*-*d* and proxy device 105. Subsequently, information identifying each device with which central device 102 established a connection can be stored to a location profile and associated with a group, such as, a Home Devices group 103. As depicted, in the example of FIG. 1, Home Devices group 103 includes peripherals 104*c*-*d* and proxy device 105.

Central device 102 can adjust its scanning duty cycle based on its determined or predicted proximity to a known group of peripherals. In the example illustrated in FIG. 1, central device 102 is located within a threshold distance of Home Devices group 103, i.e., central device 102 is proximate to Home Devices group 103. Using location information provided by satellite 106 and/or cell tower 108, the proximity of central device 102 to Home Devices group 103 can be determined and the scanning duty cycle of central device 102 can be increased in order to facilitate connections with the respective devices, e.g., peripherals 104c and 104d, and proxy device 105.

Central device 102 can also decrease its scanning duty cycle (or stop scanning completely) based on other criteria. In one or more implementations, central device 102 can be configured to decrease (or stop) its scanning duty cycle after it is determined that a connection has been successfully established with each peripheral in Home Devices group 103. The scanning duty cycle also may be decreased, or stopped, based on an indication that central device 102 is no longer located proximate to a group of known peripherals. Additionally, in some implementations, the scanning duty cycle may be decreased or stopped after central device 102 has been in proximity to a group for a predetermined amount of time, even if a connection has not been established with all peripherals in the group.

Figure 2:
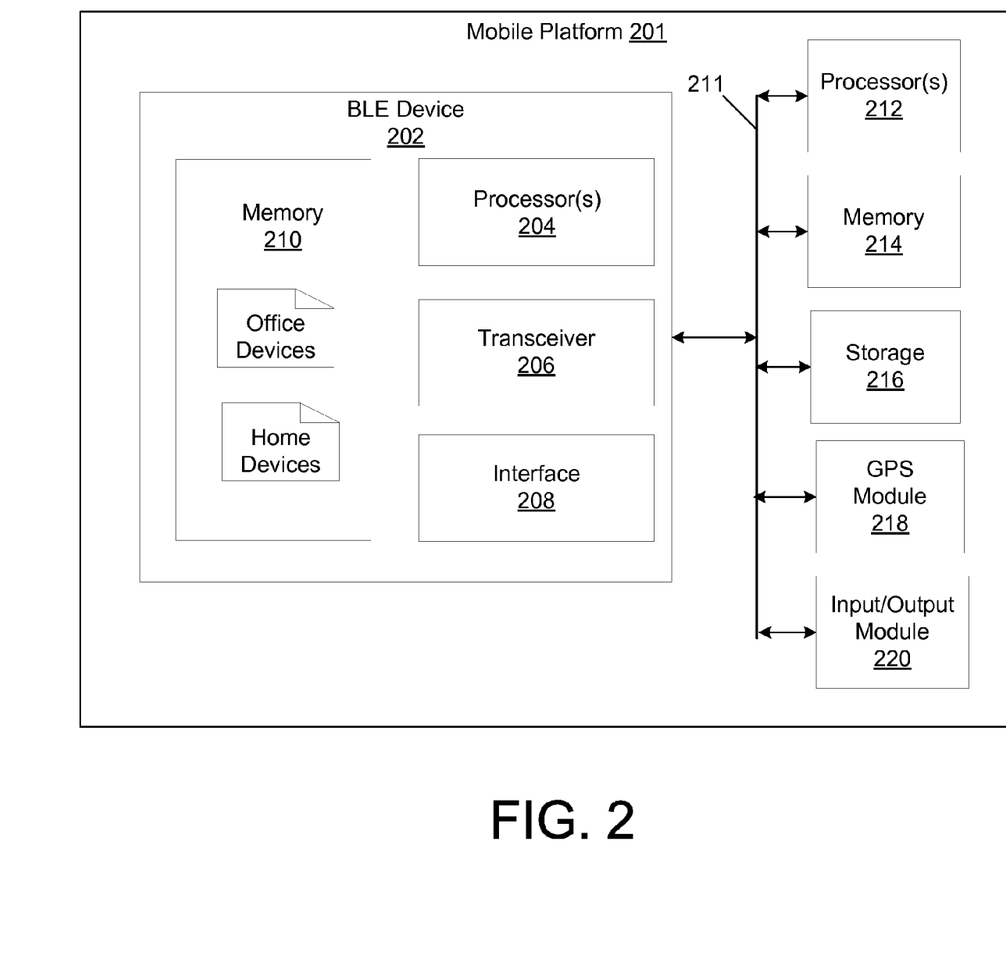
FIG. 2 illustrates a block diagram of an example mobile platform comprising a BLE device, in accordance with some implementations of the subject technology.

FIG. 2 is a block diagram illustrating an example of a mobile platform 201 that includes a BLE Device 202 configured to operate as a central device, in accordance with one or more implementations. BLE device 202 includes processor(s) 204, transceiver 206, interface 208 and memory 210. Furthermore, mobile platform 201 includes processor(s) 212, memory 214, storage 216, GPS module 218 and Input/Output (I/O) module 220. In some implementations, interface 208 can facilitate communication between BLE Device 202 and one or more of each of processor(s) 212, memory 214, storage 216, GPS module 218 and/or I/O module 220, via bus 211.

As illustrated, memory 210 can contain data defining separate groups of peripherals, for example, Office Devices group 101 and Home Devices group 103, as discussed above with respect to FIG. 1. Memory 210 and/or memory 214 can also store location profile information associated with one or more groups (e.g., Office Devices group 101 and/or Home Devices group 103), for example, that identifies a common location shared amongst peripherals. The location profile for Home Devices group 103 can include location information associated with peripherals 104c-d and proxy device 105. Similarly, the location profile for Office Devices group 101 can include location information associated with peripherals 104a-b, e.g., identifying a location different from that associated with Home Devices group 103.

BLE Device 202 can include any suitable logic, circuitry, interfaces and/or code for facilitating transmission and/or receiving of BLE signals. Additionally, processor(s) 204 can execute firmware associated with operation of BLE Device 202 for managing and/or providing support for functionality of the BLE Device 202. Firmware executed by processor(s) 204 can also facilitate communication with processor(s) 212, via interface 208. It should be appreciated that BLE Device 202 need not have on-board processor(s) 204 and that aspects of the subject technology may be performed by processor(s) 212 of mobile platform 201. Additionally, BLE Device 202 can include transceiver 206 including suitable logic and/or circuitry to facilitate transmission of wireless signals with other BLE devices. In certain aspects, transceiver 206 can also be configured to send and receive data to and from processor(s) 212.

In certain aspects, processor(s) 204 and/or processor(s) 212 can be configured to perform steps for grouping one or more peripherals into a common group based on location information. Using BLE Device 202, mobile platform 201 can connect to a plurality of peripherals in a common location, for example, peripherals 104c and 104d can be available in a user's home. After peripherals 104c and 104d have bonded with central device 102 (e.g., BLE Device 202 operating in a central role), they are grouped into a common group (e.g., Home Devices group 103) that is stored in memory 210. Home Devices group 103 can then be associated with a location profile based on the location of mobile platform 201/BLE Device 202 and/or a location of peripherals 104c and 104d.

It is understood that various hardware and software modules of mobile platform 201 can be configured to implement various aspects of the subject technology. In some implementations, mobile platform 201 can be operated alone or together with one or more other electronic systems e.g., as part of a BLE network.

In some implementations, processor(s) 204 and/or processor(s) 212 retrieve instructions to execute and data to process in order to perform the processes described in the subject disclosure. Processor(s) 204 and/or processor(s) 212 can include one or more single processors or multi-core processors in different implementations. Additionally, processor(s) 204 and/or 212 can include one or more graphics processing units (GPUs).

Storage 216 can store data and instructions that are needed by processor(s) 204, processor(s) 212 and/or other modules of central device 102. Similarly, processor(s) 204 and/or processor(s) 212 can include one or more memory locations such as a CPU cache or processor in memory (PIM), etc. The memory devices (e.g., memory 210 and memory 214) can be any read-and-write memory devices. In some aspects, one or more of the memory devices can be a non-volatile memory unit that persistently stores instructions and data, even in the absence of power.

Figure 3:
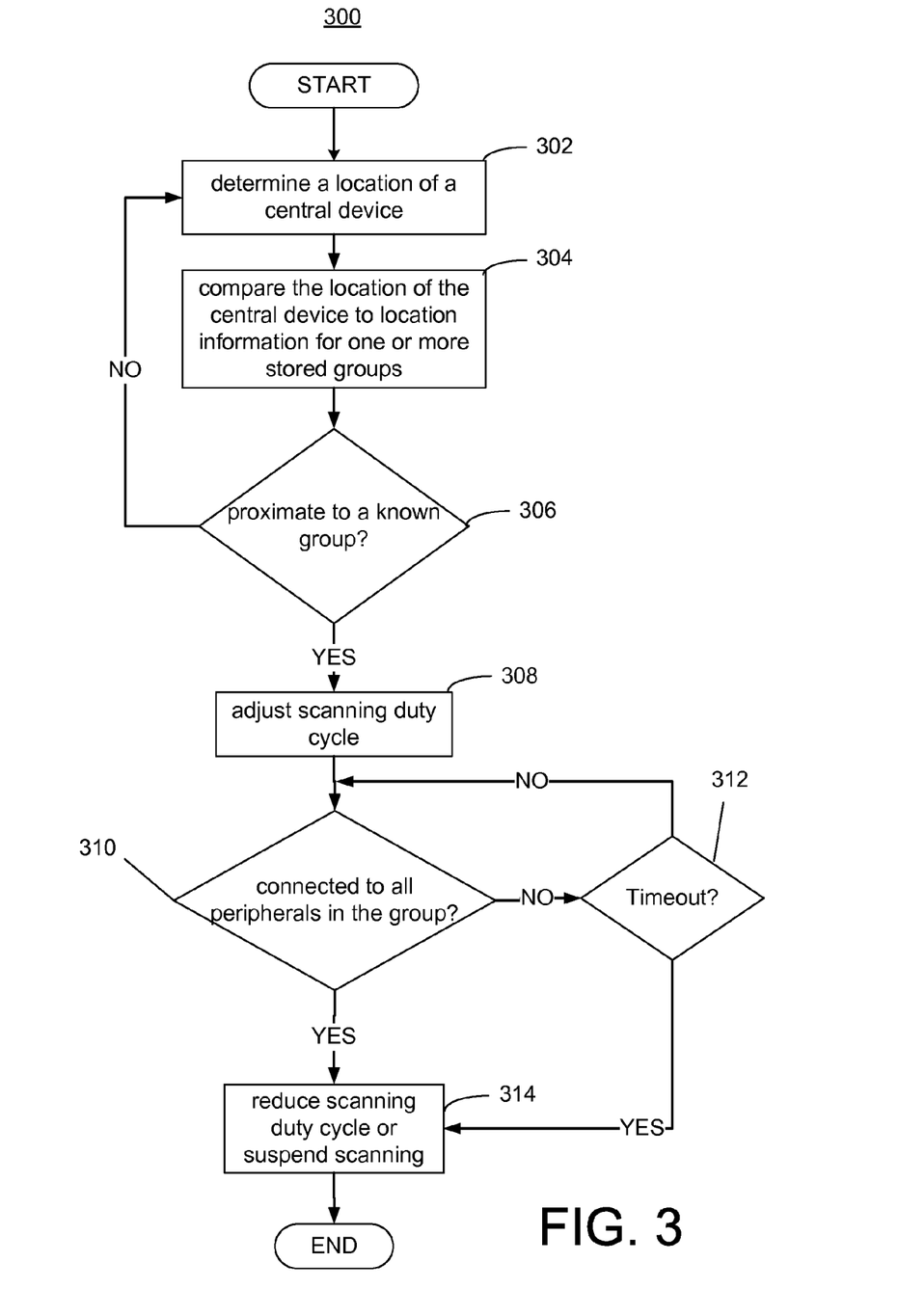
FIG. 3 illustrates a flow diagram of an exemplary process for adjusting a scanning duty cycle, in accordance with some implementations of the subject technology.

FIG. 3 illustrates a flow diagram of an example process 300 for adjusting a scanning duty cycle of a central device, in accordance with some implementations of the subject technology. Although the actions performed in process 300 are illustrated in a particular order, it is understood that process 300 is not limited by the order illustrated. Depending on implementation, one or more processes of process 300 may be performed in a different order than that shown in FIG. 3.

Process 300 begins when instructions are executed by a central device, causing the central device to determine (or predict) its location (302). The central device may determine its location based on information or signals received from one or more sources, such as satellites (e.g., GPS satellites), cell towers, and/or WIFI networks, etc. The location of the central device also may be predicted or inferred based on a connection to one or more peripherals, or based on user behavior patterns.

After the location of the central device is determined, the location is compared with location information for one or more groups, for example, that are stored by the central device in memory 210 (304). The comparison of the location of the central device with location information of a particular group may be made using various measures of proximity. In one or more implementations, the comparison may be made with respect to a predetermined threshold distance between respective locations.

Next, it is determined whether the central device is located proximate to a known group of peripherals, for example, the Home Devices or Office Devices groups discussed above (306). In one or more implementations, the proximity of the central device to a known group is based on the comparison between the location of the central device and the location information of the group. In certain implementations, once the central device is brought within the threshold distance, the device is registered as being proximate to a particular group. If it is determined that the central device is not proximate to any known group of peripherals, the location of the central device will again be determined (302).

Alternatively, if it is determined that the central device is proximate to a particular group, the scanning duty cycle of the central device is adjusted (308). In one or more implementations, wherein the central device has been brought in close proximity to a known group of peripherals, the scanning duty cycle of the central device will be increased in order to establish faster connections with peripherals of the group.

Further to the example illustrated in FIG. 1, if central device 102 is introduced to a location proximate to the Home Devices group 103, then the scanning duty cycle of central device 102 is adjusted (e.g., increased) to facilitate the establishment of connections with peripherals 104c-d and proxy device 105.

In one or more implementations, the adjusted scanning duty cycle is maintained until it is determined that the central device has either connected to all peripherals in the group, or a timeout is reached, for example, indicating that any remaining peripherals in the group are no longer available for connection. Thus, after the duty cycle of the central device is increased, it is determined whether the central device has connected with all peripherals in the group (310). If it is determined that the central device has not connected to each peripheral in the group, then it will be determined whether or not a timeout period has been reached (312). If the timeout period has not been reached, it will again be determined whether each peripheral in the group has been connected to the central device (310). Alternatively, if the timeout has been reached, the scanning duty cycle of the central device will be reduced or suspended (314).

However, if it is determined that the central device has connected with each peripheral in the group (310), the scanning duty cycle can be reduced, or altogether suspended (314). Once the central device has been reconnected to each peripheral in a group, it can be inferred that there are no remaining peripherals associated with the location profile with which the central device needs to connect. As such, the scanning duty cycle of the central device can be reduced (or stopped) to conserve power resources.

In another implementation, the adjusted scanning duty cycle of the central device can be maintained until connections have been established with a predetermined percentage of peripherals in a group. In one implementation, the central device can be configured to reduce its scanning duty cycle after 80% (or more) of the devices in a particular group have been connected to the central device. Thus, if the Home Devices group comprises ten peripherals, the duty cycle of the central device could be reduced (or stopped) after connections have been established with eight or more devices in the Home Devices group.

Figure 4:
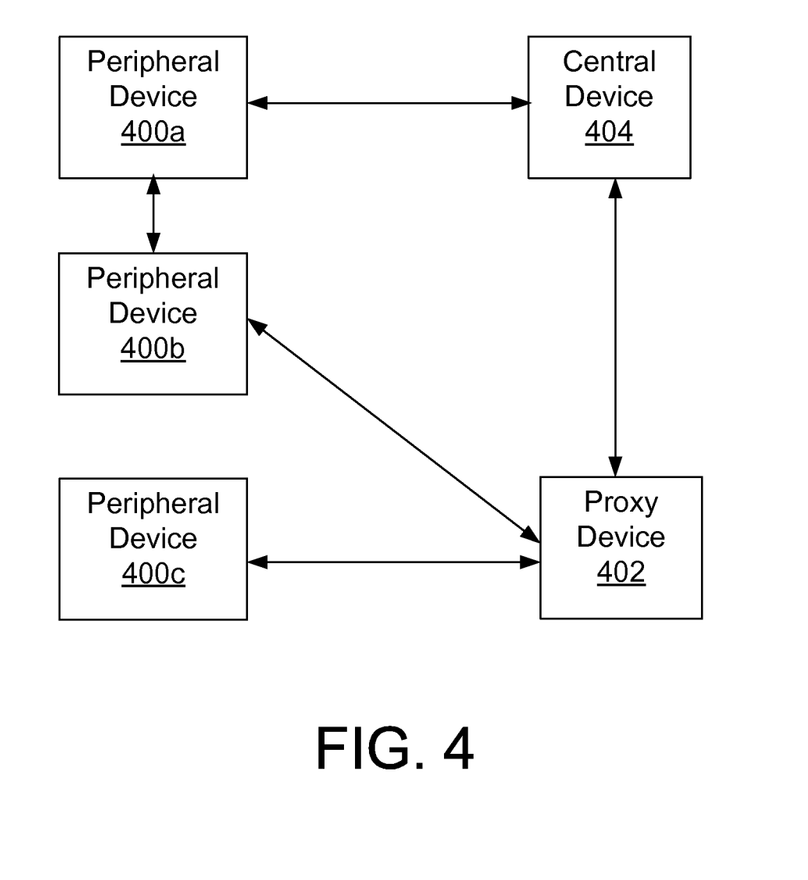
FIG. 4 illustrates a block diagram of an example BLE communication environment in which advertising can be coordinated amongst multiple peripherals, in accordance with some implementations of the subject technology.

As mentioned above, the advertising duty cycle of one or more peripherals can be coordinated in order to avoid cross talk interference between multiple peripherals in a common localized environment. FIG. 4 depicts a block diagram of a BLE environment illustrating an example of peripheral to peripheral communication for the purpose of coordinating advertising, in accordance with one or more implementations. Specifically, the environment of FIG. 4 includes peripherals 400a, 400b and 400c, as well as proxy device 402 and central device 404.

As illustrated in the example of FIG. 4, communication can occur directly between peripherals, such as, communication directly between peripherals 400a and 400b. Peripheral-to-peripheral communication may also be facilitated using a proxy, such as proxy device 402. In one or more implementations, peripherals 400a-400c may coordinate their respective advertising duty cycles based on a schedule received via proxy device 402. That is, peripherals 400a-400c may be set to broadcast advertising packets at different times and/or on different frequencies based on a communication received from proxy device 402.

Proxy device 402 can be used to relay communications between multiple peripherals and/or between the central device and one or more peripherals. In one or more implementations, the advertising duty cycle of peripherals 400b and 400c may be coordinated through communication between peripheral device 400b and peripheral device 400c that is facilitated by proxy device 402.

In one or more implementations, the advertising duty cycle of any of peripherals 400a-400c may be set by a schedule received from central device 404, via proxy device 202. Additionally, the advertising duty cycle of peripherals may be set/adjusted based on communications received directly from a central device. In certain aspects, an advertising duty cycle of peripheral device 400a may be set by central device 404 via a communication that is received by peripheral device 400a from central device 404.

In this specification, the term "software" is meant to include firmware and applications stored in memory which can be read and executed by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in a disclosed processes disclosed is an illustration of an example approach. Based upon design preferences, it is understood that the specific order or hierarchy of steps in the process may be rearranged, or that not all illustrated steps need be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A method for managing connectivity of a central device with peripheral devices, the method comprising:
   determining a location of the central device;
   determining a proximity of the central device to a peripheral device group based at least in part on a comparison of the location of the central device to a location profile associated with the peripheral device group;
   adjusting a scanning duty cycle of the central device from a first non-zero value to a second non-zero value based on the determined proximity of the central device to the peripheral device group and based on an established connection with at least one device of the peripheral device group; and
   decreasing the adjusted scanning duty cycle of the central device when connections are supported by the central device with more than a predetermined percentage of peripheral devices of the peripheral device group.

2. The method of claim 1, wherein adjusting the scanning duty cycle of the central device comprises:
   increasing the scanning duty cycle of the central device.

3. The method of claim 1, further comprising:
   supporting a connection between the central device and one or more peripheral devices in the peripheral device group,
   wherein decreasing the adjusted scanning duty cycle of the central device is based on supporting the connection of the central device with each of the one or more peripheral devices in the peripheral device group.

4. The method of claim 3, wherein decreasing the scanning duty cycle of the central device comprises:
   turning off scanning of the central device.

5. The method of claim 1, wherein determining the location comprises:
   supporting a connection between the central device and one or more peripheral devices in the peripheral device group; and
   predicting the location of the central device based on the connection of the central device to the one or more peripheral devices in the peripheral device group.

6. The method of claim 1, wherein determining the location comprises:
   predicting the location of the central device based on user history information comprising time and location data.

7. The method of claim 1, wherein the location of the central device is determined using one or more of: a global positioning system (GPS) signal, IP goo-location information and cell-tower position information.

8. The method of claim 1, wherein the adjusting comprises increasing the scanning duty cycle based on the established connection with the at least one device of the peripheral device group.

9. The method of claim 1, further comprising:
   supporting a connection with at least one other device of the peripheral device group while supporting the established connection,
   wherein the established connection and the connection with the at least one other device are associated with same communication technology.

10. A module for managing connectivity of a central device with peripheral devices, the module comprising:
    a memory configured to store location profile data for one or more groups of peripheral devices;

a processor coupled to the memory, wherein the processor is configured to perform operations for:
  determining a location of a central device comprising the module;
  determining a proximity of the central device to a peripheral device group based at least in part on a comparison of the location of the central device to a location profile associated with the peripheral device group;
  increasing a scanning duty cycle of the central device from a first non-zero value to a second non-zero value based on the determined proximity of the central device to the peripheral device group and based on supporting a connection with at least one device of the peripheral device group;
  supporting a connection with at least one other device of the peripheral device group while supporting the connection with the at least one device; and
  decreasing the increased scanning duty cycle of the central device when connections are supported with more than a predetermined percentage of peripheral devices of the peripheral device group,
  wherein the connection with the at least one device and the connection with the at least one other device are associated with same communication technology.

11. The module of claim 10, wherein the processor is further configured to perform operations for:
  supporting a connection between the central device and one or more peripheral devices in the peripheral device group; and
  wherein the processor is configured to perform operations for decreasing the increased scanning duty cycle of the central device based on supporting the connection between the central device and each of the one or more peripheral devices in the peripheral device group.

12. The module of claim 11, wherein decreasing the scanning duty cycle of the central device comprises:
  turning off scanning of the central device.

13. The module of claim 10, wherein determining the location comprises:
  supporting a connection between the central device and one or more peripheral devices in the peripheral device group; and
  predicting the location of the central device based on the connection of the central device to the one or more peripheral devices.

14. The module of claim 10, wherein determining the location comprises:
  predicting the location of the central device based on user history information comprising time and location data.

15. The module of claim 10, wherein the location of the central device is determined using one or more of: a global positioning system (GPS) signal, IP geo-location information and cell-tower position information.

16. A system for managing connectivity of a central device with peripheral devices, the system comprising:
  one or more processors;
  a wireless communication module coupled to the one or more processors; and
  a non-transitory computer-readable medium comprising instructions stored therein, which when executed by the processors, cause the processors and the wireless communication module to perform operations comprising:
    determining a location of a central device;
    determining a proximity of the central device to a peripheral device group based at least in part on a comparison of the location of the central device to a location profile associated with the peripheral device group;
    adjusting a scanning duty cycle of the central device from a first non-zero value to a second non-zero value based on the determined proximity of the central device to the peripheral device group and based on supporting a connection with at least one device of the peripheral device group;
    supporting a connection with at least one other device of the peripheral device group while supporting the connection with the at least one device; and
    decreasing the adjusted scanning duty cycle of the central device when connections are supported by the central device with more than a predetermined percentage of peripheral devices of the peripheral device group,
  wherein the connection with the at least one device and the connection with the at least one other device are associated with same communication technology.

17. The system of claim 16, wherein adjusting the scanning duty cycle of the central device comprises:
  increasing the scanning duty cycle of the central device.

18. The system of claim 17, wherein the operations further comprise:
  supporting a connection between the central device and one or more peripheral devices in the peripheral device group,
  wherein the decreasing is performed based on supporting the connection of the central device with each of the one or more peripheral devices in the peripheral device group.

19. The system of claim 18, wherein decreasing the scanning duty cycle of the central device comprises:
  turning off scanning of the central device.

20. The system of claim 16, wherein determining the location of the central device comprises:
  supporting a connection between the central device and one or more peripheral devices in the peripheral device group; and
  predicting the location of the central device based on supporting the connection of the central device to the one or more peripheral devices in the peripheral device group.

21. The system of claim 16, wherein the operations further comprise:
  supporting a connection with one or more peripheral devices in the peripheral device group in response to an advertising packet received from the one or more peripheral devices; and
  setting, by the system, an advertising duty cycle schedule for the one or more peripheral devices in the peripheral device group.

22. The system of claim 16, wherein the operations further comprise:
  supporting a connection with one or more peripheral devices in the peripheral device group in response to an advertising packet received from the one or more peripheral devices, and
  wherein the one or more peripheral devices are configured to update advertising duty cycles based on a detected advertising duty cycle of another peripheral device in the peripheral device group.

23. The system of claim 16, wherein the operations further comprise:

supporting a connection with one or more peripheral devices in the peripheral device group in response to an advertising packet received from the one or more peripheral devices, and wherein the one or more peripheral devices are configured to communicate with another peripheral device in the peripheral device group in order to coordinate advertising duty cycles.

* * * * *